Sept. 2, 1958 D. B. GRABLE 2,850,264
DUAL PASSAGE CONCENTRIC PIPE DRILL STRING COUPLING
Filed Sept. 18, 1953 2 Sheets-Sheet 1
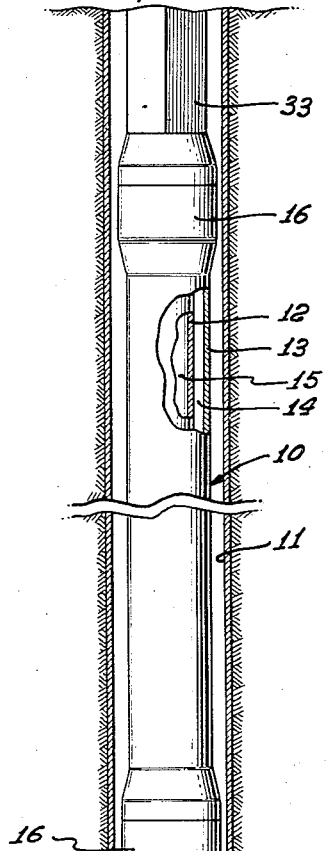
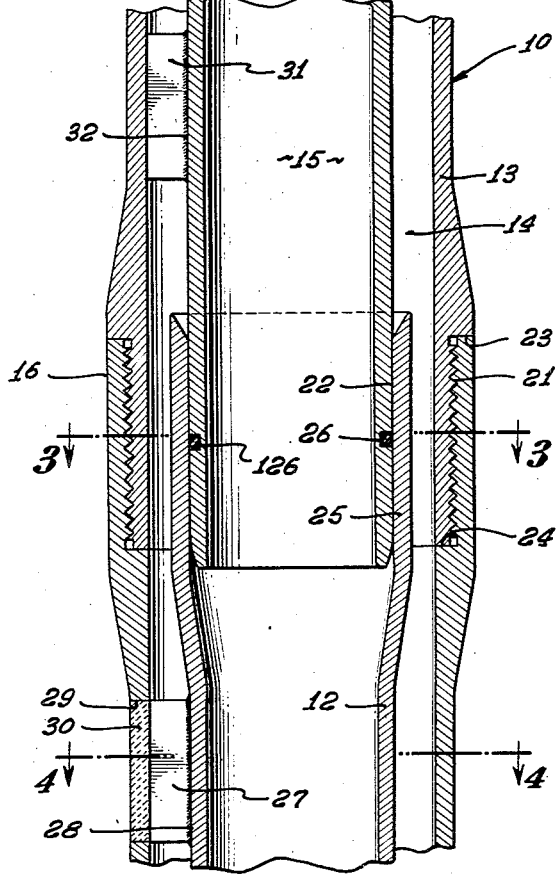
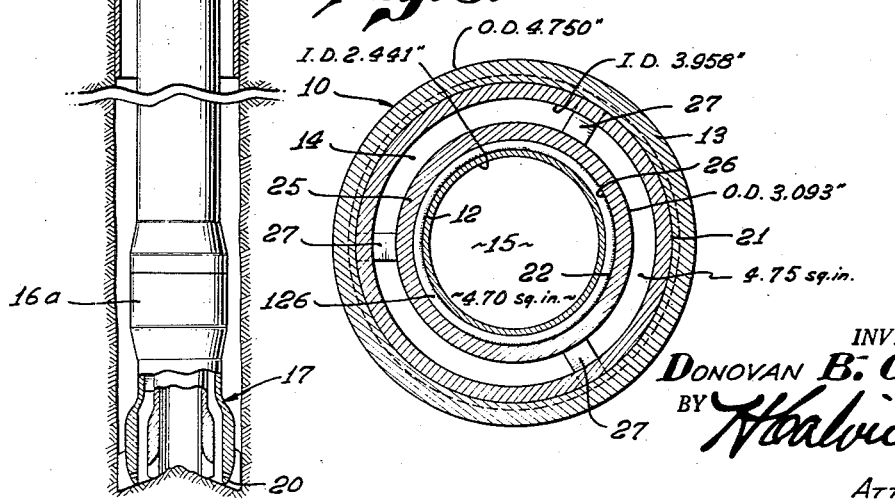
INVENTOR.
DONOVAN B. GRABLE,
BY
ATTORNEY.

Sept. 2, 1958  D. B. GRABLE  2,850,264
DUAL PASSAGE CONCENTRIC PIPE DRILL STRING COUPLING
Filed Sept. 18, 1953  2 Sheets-Sheet 2
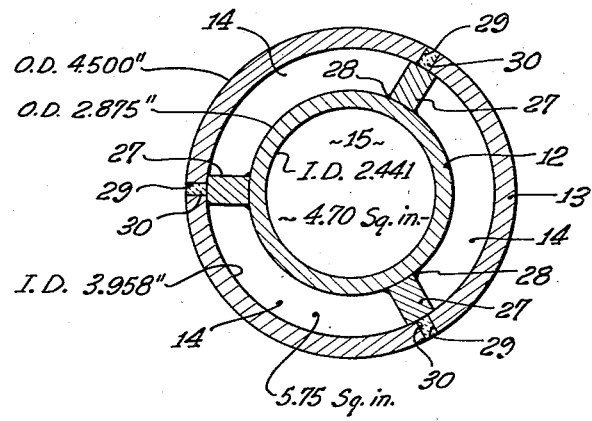
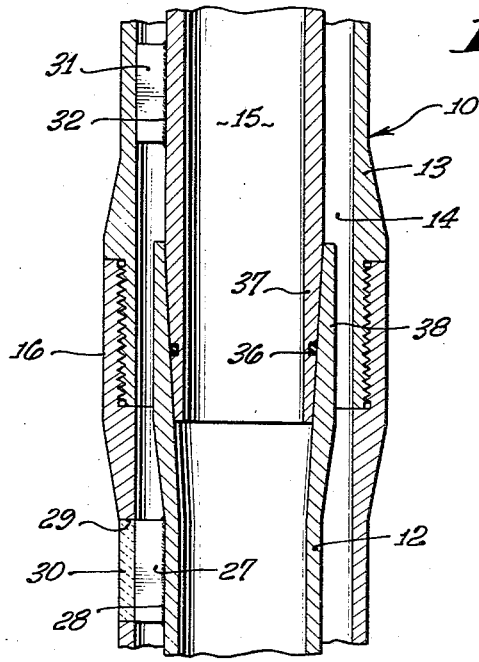
DONOVAN B. GRABLE
INVENTOR.
BY
ATTORNEYS.

# United States Patent Office 2,850,264
Patented Sept. 2, 1958

2,850,264

DUAL PASSAGE CONCENTRIC PIPE DRILL STRING COUPLING

Donovan B. Grable, Long Beach, Calif.

Application September 18, 1953, Serial No. 380,983

6 Claims. (Cl. 255—28)

This application relates to improvements in the construction of drill strings, and is a continuation in part of my copending application Ser. No. 243,626, filed August 25, 1951, for Method and Apparatus Employing Compressed Gas for Drilling Wells, now Patent No. 2,701,122, issued February 1, 1955.

The general object of the invention is to provide an improved drill string of the dual passage type, in which circulating fluid is forced downwardly through a first passage to a drilling bit, and then returns upwardly to the surface of the earth through a second passage. The two passages are formed by constructing the string of two pipes positioned one about the other and desirably in concentric relation, so that fluid may flow downwardly through an annular space between the pipes, and return upwardly within the inner pipe. Each stand of the drill string includes a pair of such inner and outer pipes attached together for handling as a unit.

The invention is particularly concerned with the manner of formation of the joints by which the various sections or stands of the drill string are connected and sealed together in use. As will appear, the stands are so constructed that a single motion of one stand relative to another will simultaneously form two fluid tight joints between the stands, one between their inner pipes and the other between their outer pipes. Preferably both of these joints are externally upset and internally straight cylindrical, in order to minimize the resistance to fluid flow through the string passages for a particular size of drill pipe, while at the same time assuring adequate strength in the joint. This feature is especially important where the circulating fluid is a compressed gas, as for instance air or a hydrocarbon gas, since such a circulating gas must flow at a rather high velocity in order to carry the cuttings to the surface of the earth, and any restrictions in the drill string passages will of course impede the gas flow.

The joint between the outer pipes of the stands, is a threaded joint whose tightening is limited at a definite made up condition by engagement of transverse annular shoulders on the outer pipes. The threads and shoulders of this outer joint may serve to effectively seal the joint. The inner joint is desirably sealed by a deformable ring, typically a rubber O ring. A particular advantage of the use of such a ring resides in its capacity for sealing the inner joint without dependence upon the inner pipes being moved to a single predetermined made up condition, so that the inner joint is sealed at whatever condition happens to be the completely made up condition of the outer threaded joint.

In contemplation of temperature variations to be encountered in the drill string, the ends of the inner pipes are interconnected by expansion-type joints, to allow differential expansion of the inner and outer pipes of each stand. In this case, the two pipes of each stand are so attached together as to permit such differential expansion. This may be effected by attaching the pipes in fixed relation at one location, typically at first ends thereof, and mounting them for relative axial movement at a second location or end.

The above and other features and objects of the present invention will be better understood from the following detailed description of the typical embodiments illustrated in the accompanying drawing, in which:

Fig. 1 is a side view partially broken away of a dual passage drill string embodying the invention;

Fig. 2 is an enlarged fragmentary vertical section through one of the joint portions of the Fig. 1 string;

Figs. 3 and 4 are horizontal sections taken on lines 3—3 and 4—4 respectively of Fig. 2; and Fig. 5 is a vertical section through a variational type of joint for use in the Fig. 1 drill string.

Referring first to Fig. 1, I have shown at 10 a dual passage drill string positioned within a well 11. String 10 comprises a number of dual passage pipe stands each formed of a pair of inner and outer concentric pipes 12 and 13, to form within the string an outer fluid circulating passage 14 between the two pipes 12 and 13, and an inner passage 15 within the inner pipe. The various dual passage stands or sections of the pipe string are detachably interconnected at joint locations 16.

At its lower end, string 10 carries bit 17, which has tubular inner and outer concentric walls forming lower continuations of the pipes 12 and 13, and forming lower continuations of string passages 14 and 15. The inner and outer passages within the bit communicate at the bottom of the bit adjacent cutters 20, so that circulating fluid may be passed downwardly through outer passage 14 to flow past the bit cutters and then upwardly through inner passage 15 to the surface of the earth. This fluid circulation picks up the cuttings formed by bit 17, and carries them to the surface of the earth.

The joint structure for interconnecting successive stands of the dual passage drill string is shown specifically in Fig. 2. This joint structure includes an outer threaded joint 21 interconnecting the pipes 13, and an inner expansion joint 22 between the inner pipes 12. At both of these joints, the connected pipes have internally flush or substantially straight line walls, while the joined pipes are externally upset or increased in diameter. This externally upset arrangement allows maximum freedom of flow of the circulating fluid through both passages in the string, while at the same time assuring adequate strength in the string joints. The upsetting of both the inner and outer pipes is preferably such that the combined wall thickness of each pair of engaged interconnected pipes is about 1½ times the wall thickness of the individual pipes themselves.

The threads of outer joint 21 are preferably tapered slightly. At the ends of these threads, the two outer pipes 13 have annular transverse shoulders engaging at 23 and 24, to limit the tightening of the joint, and assure formation of a fluid tight seal between the connected pipes.

To form the inner expansion joint 22, one of the inner pipes 12 has a terminally upset or enlarged diameter portion 25, adapted to be telescopically and slidably received about the outer surface of the end portion of a mating inner pipe 12. This second or mating inner pipe has an outer annular groove 26, within which is received a deformable and resilient annular seal ring 26, preferably a rubber O-ring, which engages and forms a seal with the inner surface of portion 25 of the upset inner pipe end. The telescopically interfitting portions of the inner pipes may be in engagement, a clearance of .005" typically being provided between the accurately machined surfaces of these pipes. Bit 17 is attached to the lowermost of the drill string stands by a joint structure 16a corresponding substantially to that shown in Fig. 2.

The upper end of the inner pipe of each stand is attached in fixed relation to the outer pipe of that stand by several, typically three, circularly spaced radially and axially extending lugs or webs 27. These lugs 27 may be attached to inner pipe 12 before its insertion into outer pipe 13, the attachment being made by welding at 28. The lugs are then machined down to a diameter corresponding substantially to the internal diameter of outer pipe 13, following which the inner pipe is inserted into the outer pipe to a location at which lugs 27 are received directly opposite a series of axially extending slots 29 which have been previously cut through the wall of the outer pipe. Welding material 30 is then filled into slots 29 to form a tight connection between lugs 27 and the outer pipe, and thus rigidly interconnect the outer and inner pipes. At the second end of inner pipe 12, a second series of radial webs or lugs 31 are attached to the outer surface of the pipe, as by welding at 32. These lugs, typically three as in the case of lugs 27, are then machined down to have an external diameter corresponding to the internal diameter of outer pipe 13, and when the inner pipe is then inserted into the outer pipe, lugs 31 act as webs for concentrically positioning the inner and outer pipes, while permitting their relative axial movement at the location of lugs 31 in response to temperature changes. At the location of lugs 31, there are of course no slots provided in the wall of the outer pipe, and the lugs are in no other way directly attached to the outer pipe.

In using the string 10 of Figs. 1 to 3, the string is connected to the lower end of an externally non-circular kelly 33, having a pair of internal passages communicating with passages 14 and 15 respectively. As the kelly and string are turned to drill the well, circulating fluid is passed downwardly through passage 14 and past the bit cutters 20, and then reverses its flow to pass upwardly through passage 15 to the surface of the earth. The joints 21 and 22 effectively isolate the two passages 14 and 15 within the string. In the event of temperature changes in the well, or if the string is utilized for passing a hot liquid downwardly into the well, the various inner pipes are free for longitudinal expansion at different rates than the outer pipes 13. Upon such differential expansion, the telescopically interfitting ends of the inner pipes, at expansion joints 22, may move relatively a short distance, while still maintaining an effective seal by virtue of seal ring 26. This differential expanding (or contracting) movement is also permitted by sliding movement of lugs or webs 31 within outer pipes 13.

For a most effective drilling action, I preferably employ as the circulating fluid a compressed gas, preferably a hydrocarbon such as methane, which must flow upwardly within passage 15 at a relatively high velocity, at least about 1500' per minute, to assure entrainment of the cuttings in the upwardly moving gas. To enable the maintenance of such a high velocity fluid flow, it is extremely important that the gas passages within the drill string and its joints be so formed as to minimize the restriction to gas flow.

It is found highly desirable that these passages be so formed that the minimum cross sectional area of the outer passage 14 is approximately equal to the minimum cross sectional area of inner passage 15. The minimum area of the outer passage of course usually occurs at the location of the joints interconnecting successive pipe stands. Figs. 3 and 4 illustrate the dimensions preferably given the pipe walls and gas passages at the joints and inter-joint locations respectively, in a preferred size of drill string, which is designed to be run in practically all conventional casing and well bore sizes. In this preferred size of string, the upset portions of the outer pipes 13 have an outside diameter of 4.750" and an inside diameter of 3.958". The upset end 25 of each inner pipe 12 has an outside diameter of 4.750" and an inside diameter of 3.958". pipe 12 has an inside diameter of 2.441". The gas passages 14 and 15 at the joint locations have closely corresponding cross sectional areas respectively of 4.75 and 4.70 square inches.

Beyond the upset joint locations, the outer pipe has an outside diameter of 4.500" (see Fig. 4), and an internal diameter of 3.958"; the inner pipe having an outside diameter of 2.875" and an inside diameter of 2.441". The cross sectional area of inner passage 15 remains 4.70 square inches along substantially its entire extent, with the outer passage 14 enlarging at the inter-joint locations to 5.75 square inches. While it is desirable that these dimensions, or their relative values, be maintained, it will be understood that minor variations may occur so long as the essential strength and openness of the fluid circulating passages are retained.

Fig. 5 shows a further variational form of joint, which is identical with that of Fig. 2, except that the opposed surfaces of the telescopically interfitting ends 37 and 38 of the inner pipes are slightly tapered. This arrangement is found most desirable for small diameter pipes, since the tapering of the inner pipes allow a reduction in the combined wall thicknesses of the inner pipes at the joints.

I claim:
1. A drill pipe string comprising: a series of dual-passage metallic pipe stands each including an inner pipe and an outer pipe attached to said inner pipe in coaxial spaced relation, each of said inner pipes containing an inner passage with said inner passages of successive stands being in communication with one another at their adjacent ends, said two pipes of each stand forming radially therebetween an outer passage isolated from the inner passage of the corresponding stand with said outer passages of successive stands being in communication with one another at their adjacent ends, each of said outer pipes having integral threaded end portions directly threadedly interengageable with the end portions of the outer pipes of successive stands to form a joint between said outer pipes and to secure successive stands together, said end portions having shoulders engageable axially against one another in the fully made-up condition of said joints to limit joint-tightening relative rotational movement and to transmit rotary motion between adjacent stands, each of said inner pipes having integral end portions constructed so that adjacent end portions of the inner pipes of successive stands will fit telescopically one within the other to form therebetween fluid-passing joints having generally-cylindrical axially-extending telescopically-interfitting opposed surfaces, said adjacent inner pipe end portions, in the fully made-up condition of said outer pipe joints, being free of axially interengageable stop surfaces which will prevent a limited range of relative axial movement between said adjacent inner pipe end portions occasioned by thermal and/or tensile differential expansion and/or contraction effects on the metal of said pipes, one of said opposed surfaces having therein a circumferential groove; a deformable seal ring in said groove and slidably engageable with the other of said surfaces to form a seal preventing fluid leakage between said inner and outer passages; means adjacent both ends of said inner pipe of each stand centering said ends in the outer pipe of said stand; and means attaching said inner pipe of each stand in fixed axial position relative to the outer pipe of said stand at a single location along the lengths of the pipes of said stand.

2. A drill pipe string as recited in claim 1 in which the outer pipes are externally upset at their joints.

3. A drill pipe string as recited in claim 1 wherein the minimum cross-sectional area of the series of inner passages is about the same as the minimum cross-sectional area of the series of outer passages.

4. A drill pipe string as recited in claim 1 in which the interengageable shoulders on the outer pipes are annular and have annular engagement therebetween to form a fluid-tight seal preventing fluid leakage past the threaded joints.

5. A drill pipe string as recited in claim 1 wherein the opposed telescopically interfitting surfaces of the adjacent end portions of the inner pipes of successive stands are correspondingly slightly tapered and wherein the maximum radial separation between said surfaces is a minor portion of the radial dimension of the seal ring in radial section.

6. A drill pipe string as recited in claim 1 in which the groove is formed in the outwardly facing one of the two opposed surfaces.

References Cited in the file of this patent

UNITED STATES PATENTS

| | | |
|---|---|---|
| 1,218,359 | Beatty | Mar. 6, 1917 |
| 1,781,049 | Brinton | Nov. 11, 1930 |
| 1,909,075 | Ricker et al. | May 16, 1933 |
| 2,054,859 | Kitching | Sept. 22, 1936 |
| 2,447,340 | Jackson | Aug. 17, 1948 |
| 2,494,803 | Frost | Jan. 17, 1950 |
| 2,610,028 | Smith | Sept. 9, 1952 |
| 2,676,037 | Mueller | Apr. 20, 1954 |

Notice of Adverse Decision in Interference

In Interference No. 91,037 involving Patent No. 2,850,264, D. B. Grable, DUAL PASSAGE CONCENTRIC PIPE DRILL STRING COUPLING, final judgment adverse to the patentee was rendered Jan. 15, 1963, as to claims 1 and 3.

[*Official Gazette May 4, 1965.*]